United States Patent [19]

Hunter

[11] 4,265,537
[45] May 5, 1981

[54] VEHICLE WHEEL ALIGNMENT DIAGNOSING APPARATUS

[76] Inventor: Lee Hunter, 13501 Ladue Rd., Creve Coeur, Mo. 63141

[21] Appl. No.: 942,302

[22] Filed: Sep. 14, 1978

[51] Int. Cl.³ .............................................. G01B 11/26
[52] U.S. Cl. ...................................... 356/155; 33/288; 396/152
[58] Field of Search .............................. 356/152, 155; 33/203–218, 288

[56] References Cited

U.S. PATENT DOCUMENTS

| | | | |
|---|---|---|---|
| 2,601,262 | 6/1952 | Carrigan | 356/155 |
| 4,095,902 | 6/1978 | Florer et al. | 356/155 |
| 4,097,157 | 6/1978 | Lill | 356/155 |
| 4,126,943 | 11/1978 | Senften | 33/228 |

*Primary Examiner*—R. A. Rosenberger
*Attorney, Agent, or Firm*—Gravely, Lieder & Woodruff

[57] ABSTRACT

Apparatus comprising active alignment sensors mounted on the steerable wheel of a vehicle to follow the plane of rotation of these wheels, cooperating passive alignment means positionable selectively on the non-steerable wheels and on the adjacent vehicle body in view of the active sensors, and associated electronic equipment assembled in a console and responsive to signals generated by the active sensors for displaying alignment characteristics important to achieve motion balance in the vehicle for proper rolling response of the wheels and directional attitude of the vehicle body with steering wheel center-point position.

11 Claims, 9 Drawing Figures

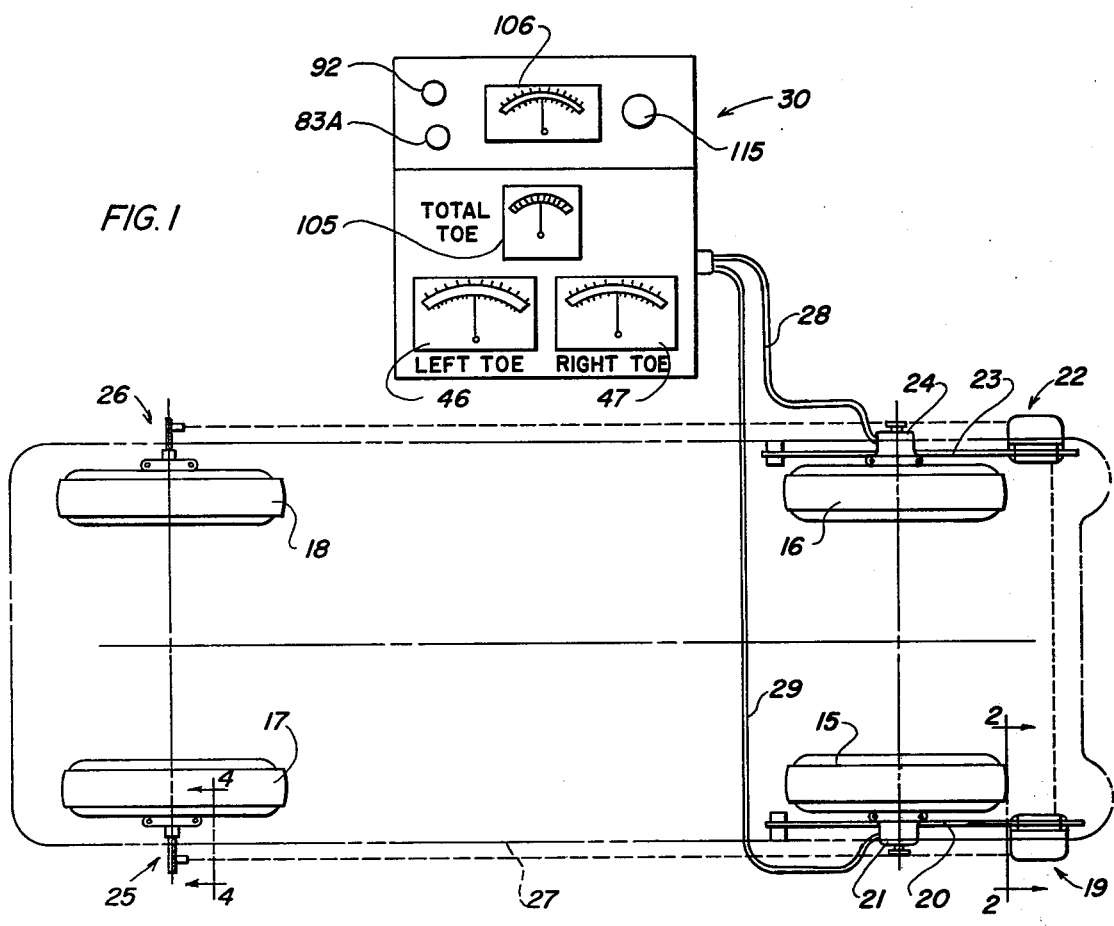

VEHICLE WHEEL ALIGNMENT DIAGNOSING APPARATUS

BACKGROUND OF THE INVENTION

The ideal geometric configuration of a four wheel vehicle is a rectangle in which: the steerable wheels will run parallel with each other and are equidistant from the center of the connecting axle or its equivalent; in which the non-steerable wheels will run parallel with each other and are equidistant from the center of the connecting axle or its equivalent; in which the non-steerable wheels either track with the steerable wheels or are equally off set from the steerable wheel tracks; and in which the vehicle body has its longitudinal geometric center line coincident with the longitudinal center line for the steerable and non-steerable wheels.

The practical and economic considerations involved in the production of wheeled vehicles take into account the complications in connection with manufacturing tolerances present in the various parts and the possibility that tolerance mis-matching can build up variations from the ideal geometric configuration. As a consequence of the possible mis-matching of tolerances in the parts making up a finished vehicle provision is made for mechanically adjusting wheel positions relative to the chassis or body of a vehicle. In some vehicles all adjustments are found in the steerable wheel assemblies, while in others the adjustments are provided in both the steerable and non-steerable wheel assemblies. Generally vehicles are permitted to have some deviations from the ideal conditions of wheel alignment and wheel to body alignment. As long as the deviations are not regarded as serious the vehicle is put into use.

In the vast majority of cases vehicles are sold with the alignment characteristics well within specification tolerance, and the alignment provides satisfactory results for the owners. Nevertheless, after a period of use the mechanism mounting the wheels on the chassis or body wear, and the alignment characteristics deviate from normal tolerance. Of course, under such conditions the provisions made for adjusting wheel alignment are used to restore the alignment to the desired conditions. A well treated vehicle can have its alignment diagnosed and adjusted to specifications, but one that has been mintreated or has been involved in a collision is much more difficult to diagnose or correct.

The many conditions attached to the original assembly of vehicles, and the equally many things that can occur to change wheel alignment on vehicles in use, make the design of apparatus to diagnose those conditions and changes very difficult. In the past apparatus has been provided that is capable of limited wheel alignment diagnosing ability. Some apparatus is simple to operate and some is very difficult and complicated, but in either type of apparatus there is little or no provision for obtaining a complete understanding of the interrelations of the steerable to non-steerable wheels, or of the relationship between wheels and vehicle body, or of the part that center point steering wheel position plays in relation to the other characteristics.

Examples of apparatus devised for examining vehicle wheel alignment characteristics include Carrigan U.S. Pat. No. 2,601,262, issued June 24, 1952, which is a light beam projection system incorporating passive light reflective mirrors on the steerable and non-steerable wheels and a chart spaced away from the vehicle to be in alignment with the light beam. Wheel alignment testing equipment involving placing it against machined surfaces on the wheels is shown in Holub U.S. Pat. No. 2,972,189 issued Feb. 21, 1961. This equipment is directed to the capability of locating and measuring misalignment in the frame and front and rear housings of a vehicle, as well as checking wheel tracking, all with line of sight telescopes and mechanical components. A somewhat similar vehicle wheel alignment device has been disclosed in MacMillan U.S. Pat. No. 3,091,862 issued June 4, 1963, but this is limited to use of sighting tubes and portable targets.

More sophisticated apparatus for indicating wheel alignment characteristics has been shown in Manlove U.S. Pat. Nos. 3,164,910 issued Jan. 12, 1965 and 3,181,248 issued May 4, 1965 respectively. In these arrangements mechanical pointers are caused to move over scales for checking alignment characteristics. The use of light beam projecting means for wheel alignment checking is disclosed by Holub U.S. Pat. No. 3,337,961 issued Aug. 27, 1967. However, the projectors illuminate scales at different times and so avoid simultaneous operation. Another system for using light beams in association with steerable wheels has been disclosed by Senften U.S. Pat. No. 3,782,831 issued Jan. 1, 1974 in apparatus for determining the angular position between a fixed and a movable body, such as the position of the steerable wheels relative to the axle. Electronic scanning devices butted against the vehicle steerable and non-steerable wheels has been disclosed by Hirmann U.S. Pat. No. 3,855,709 issued Dec. 24, 1974 wherein the scanning devices measure chassis geometry from the wheel position.

Alignment equipment limited to front wheel toe is shown in Butler U.S. Pat. No. 3,865,492, issued Feb. 11, 1975. This type of equipment has severe limitation as to what information can be obtained about the alignment characteristics of vehicle wheels and body. The prior art includes the electronic run-out compensation means of Senften U.S. Pat. No. 3,892,042 issued July 1, 1975 which is concerned with getting wheel alignment checking means properly oriented with the plane of wheel rotation. More recently, electronic alignment apparatus for indicating front wheel toe has been disclosed by Rishoud, et al U.S. Pat. No. 3,963,352 issued June 15, 1976, or by Florer, et al in U.S. Pat. No. 4,095,902 issued June 20, 1978, or by Lill in U.S. Pat. No. 4,097,157 issued June 27, 1978.

BRIEF DESCRIPTION OF THE INVENTION

This invention relates to vehicle wheel alignment diagnosing apparatus, and is particularly concerned with means to diagnose wheel positions among themselves and in relation to vehicle body alignment and steering wheel center point position.

An important object of the present invention is to provide apparatus that is able to diagnose wheel alignment to obtain motion balance which is vehicle rolling movement in a straight line with the steering wheel in center point position, while taking into account the alignment of the wheels relative to the actual center line of the vehicle body, the alignment of wheels relative to the geometric center line related to the axles, and the thrust line developed by the toe angle of the non-steerable wheels.

Another object of this invention is to provide an organization of active sensor means for the steerable wheels, passive reflective means for the non-steerable wheels and body, and electronic means to process signals from the active sensor means and display selected results of importance to the alignment characteristics as they are found to exist.

Yet another object is to provide apparatus that can find and measure alignment characteristics of a vehicle in respect of total toe in the non-steerable wheels, individual toe of the non-steerable wheels, non-steerable wheel thrust line and the angular relation thereof to the wheel center-line and body center-line of the vehicle, off-set of the non-steerable wheels relative to the steerable wheels, and steerable wheel set-back.

Other objects of the present invention are to provide means for determining the alignment characteristics of all of the vehicle wheels from active measuring sensors mounted on the steerable wheels and cooperative passive measuring means on the body and/or on the non-steerable wheels, to provide means which will speed up the determination of vehicle wheel alignment, to provide means for distinguishing the alignment characteristics of the non-steerable wheels from the steerable wheels to determine if correction is needed, and to provide means which utilizes the non-steerable wheel alignment information in determining what the steerable wheel alignment should be to result in desirable wheel to body alignment with center point steering.

Further objects of the present invention are to simplify the construction of the essential apparatus, to increase the accuracy of results in the use of the apparatus, to devise apparatus that may be used with a variety of wheel mounting arrangements, and to be able to check out the critical wheel alignment parameters quickly, accurately and with instruments having unique characteristics.

BRIEF DESCRIPTION OF THE DRAWINGS

The various components making up the apparatus of the present invention have been disclosed in the accompanying drawings, wherein:

FIG. 1 is a general plan view of the wheel layout of a vehicle and an outline of the body therefor, together with the major components of apparatus for diagnosing alignment characteristics of the steerable and non-steerable wheel sets and wheel to body relationship;

FIG. 2 is an elevational view of a typical sensor unit carried on a steerable wheel, the view being taken along line 2—2 in FIG. 1;

FIG. 3 is transverse view of the sensor unit of FIG. 2 as seen along line 3—3;

DETAILED DESCRIPTION OF THE INVENTION MECHANICAL APPARATUS

Figure 5:
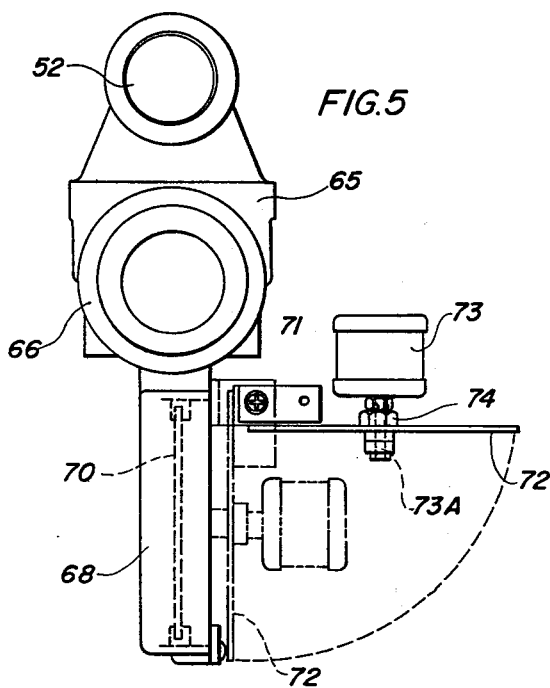
FIG. 5 is a view of the typical thrust line unit of FIG. 4 as seen along line 5—5 with the retro-reflector and its support moved into position to uncover a reflector mirror.

A presently preferred vehicle wheel alignment diagnosing apparatus is seen in FIG. 1 in association with a vehicle having a right steerable front wheel 15, a left steerable front wheel 16, a right non-steerable rear wheel 17, and a left non-steerable rear wheel 18. The instrumentation for the present apparatus includes a sensor unit 19 carried on a support arm 20 which is part of a mounting device 21 attached to the wheel 15, and a similar sensor unit 22 carried on a support arm 23 which is part of a mounting device 24 attached to the wheel 16. Each device 21 and 24 embodies run-out compensation means of a type disclosed in Senften U.S. Pat. No. 3,891,042 granted July 1, 1975. The purpose of the run-out compensation means is to position the sensor units 19 and 22 in a predetermined relationship with the plane of rotation of the front wheels 15 and 16 respectively. Furthermore, each sensor unit embodies a photocell in position to be energized when scanned by a light beam. The photocells will be described presently.

The sensor units 19 and 22 have the photocells activated in a predetermined manner by passive alignment means carried by thrust line units mounted on the rear or non-steerable wheels. These passive means and thrust line units are seen in FIG. 1 at 25 on the right rear wheel 17 and at 26 on the left rear wheel 18. Each thrust line unit 25 and 26 includes a flat mirror and a retro-reflector for returning light beams projected longitudinally of the vehicle, represented by the body outline 27, and returned to the sensor units 19 and 22 on the front wheels being tracked or followed by the rear wheels. Each thrust line unit 25 and 26 is constructed so the center area of the mirror, as well as the position of the retro-reflector, is substantially the same distance out from the plane of rotation of the wheel on which they are supported.

The sensor units 19 and 22 project light beams transversely of the vehicle body 27 toward the opposite sensor unit as well as toward passive reflectors at the rear wheels. The transverse beam signals are designated L and the longitudinal signals are designated $L^1$. Signals generated at the photocells in the sensor units 19 and 22 are individually transmitted by bundle wire leads 28 and 29 to a console 30 where they are processed and displayed. The console 30 may be stationary or it may be mobile so that the signal display can be better seen while adjustments are being performed on the vehicle wheels. The details of the sensor unit 19 carried by the steerable right front wheel 15 will also apply to the sensor unit 22 on the steerable left front wheel 16.

FIGS. 2 and 3 show the typical sensor assembled in a suitable housing 31 which is made up of two parts engaged at a slip joint 32. The unit includes a fixed bracket 33 attached to a plate 34. A cast body 35 is pivoted on the bracket 33 at pivot element 36 so the body can swing back and forth in a horizontal plane. The body 35 carries a light beam projector 37 and a second projector 38 at substantially 90° to the first projector so that a single source of light 39 will be projected at the same time by each projector 37 and 38. A motor 40 drives a cam 41 mounted on shaft 42, and the body 35 is provided with a cam follower 43 which is held on the cam surface by a spring 44. The cam 41 is contoured to effect oscillations or sweeps of the light beam projectors 37 and 38 in one direction through an angle of about 240° of cam rotation, and through the remaining angle of about 120° of cam rotation to the starting position. The sweep angle is selected to cause the longitudinally directed light beams from projectors 38 to scan the position of the passive reflective means so the reflected light beam path returned from the thrust line units 25 and 26 will activate photocells 38A. Potentiometer means 45 rotates with the cam 41 and generates signals which are the analogs of the angle of the returning light beam directed from the passive reflector means and the andle of the transverse light beam upon reaching the photocells 37A. The speed of rotation in the sweep angle of 240° of cam rotation will be about one-half the return speed through the sweep angle of 120°. The sensor unit 19 is mounted in operative position on the arm 20, and the circuits from the potentiometer means 45, and for the common source of light 39 pass through arm 20 and emerge in lead 29. The make-up of sensor unit 22 is the same, and the circuits are embodied in lead 28. The construction of the respective sensor units 19 and 22 is best set forth in pending application of David A. Senften, Ser. No. 798,780, filed May 20, 1977 now U.S. Pat. No. 4,126,943, dated Nov. 28, 1978.

Figure 4:
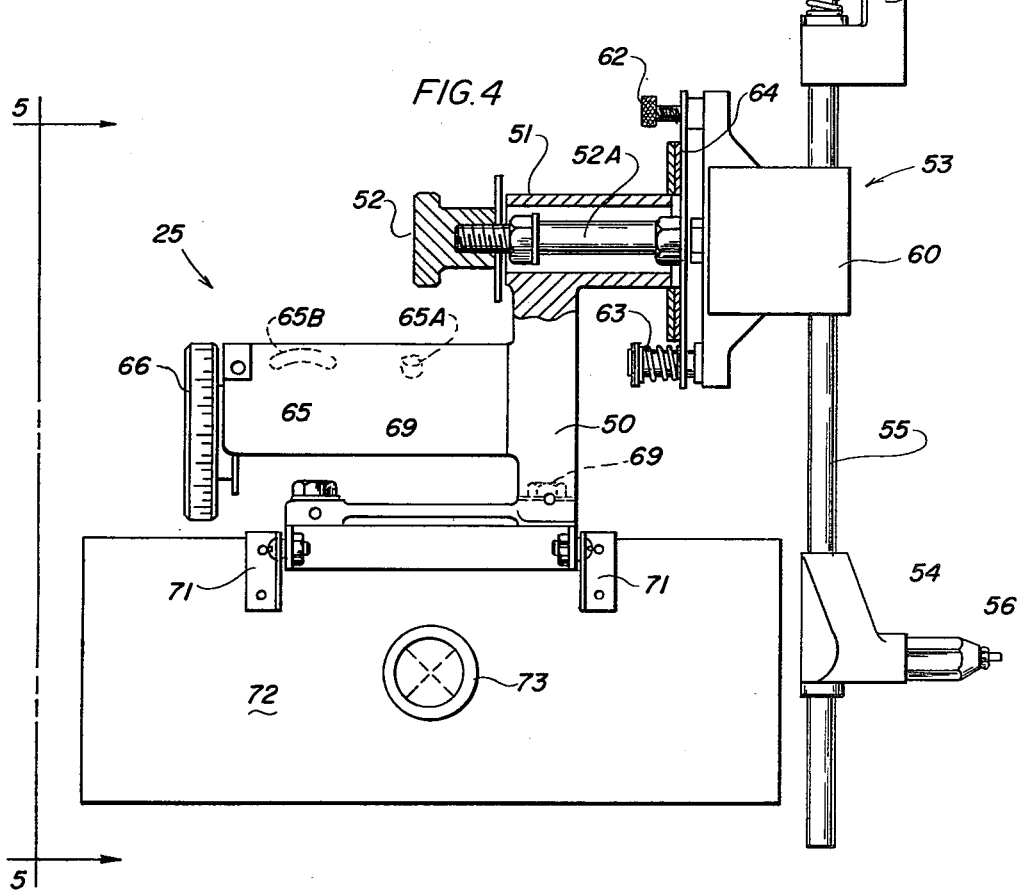
FIG. 4 is an elevational view of a typical thrust line unit carried on a non-steerable wheel, the view been taken along line 4—4 in FIG. 1 with portions shown in section.

In FIGS. 4 and 5 there is seen a thrust line unit which is typical of the units 25 and 26, the one being shown is mounted on the right rear non-steerable wheel. This unit has a frame 50 providing a housing 51 for supporting the clamping means 52 which holds the assembly in pendent position from the wheel mounting adapter 53 of a type seen in Lee Hunter pending application, Ser. No. 881,722 filed Feb. 27, 1978 now U.S. Pat. No. 4,167,817, dated Sept. 8, 1979. The adapter comprises a lower bracket 54 carried on a pair of rods (one being shown) 55 so its wheel rim contact pin 56 is projected toward the wheel rim. The rods 55 also carry a slidable and adjustable bracket 57 opposite the bracket 54 in position to present a wheel rim contact pin 58 which cooperates with the first mentioned pin 56. The bracket 57 is displaced and locked on rods 55 by manipulating the key 59 to drive the pins 56 and 58 into the wheel rim. A centrally disposed bracket 60 is slidable along the rods 55 so the axis of the draw rod 52A may be brought into close alignment with the axis of rotation of the wheel. A plurality of run-out compensating elements (one of three being shown) 62 and cooperating spring guides 63 are provided on a disc 64 to function in connection with adjusting the axis of the draw rod 52A so it is parallel to the axis of wheel rotation. This run-out compensation provision makes it possible to place a wheel camber meter 65 in proper position to determine camber by rotating the dial 66 to center a bubble device 65B. The hange position is determined by bubble device 65A. This places the mirror in proper vertical position and also the dial 66 will show the amount of positive or negative or zero camber present in the wheel.

The unit is equipped with a depending frame 68 held by threaded means 69 so a flat mirror 70 carried in the frame can be positioned to be substantially perpendicular to the plane of rotation of the non-steerable wheel on which it is carried. The assembly includes a pair of friction controlled hinges 71 which support a plate 72 movable (FIG. 5) between raised full line position to expose the mirror 70 and lowered broken line position to obscure the mirror. The plate 72 carries at a central location a retro-reflector device 73 which may be dismounted, when necessary, by pulling its stem 73A out of a socket 74 which normally frictionally retains the stem 73A so the retro-reflector will not fall off the plate 72.

Figure 6:
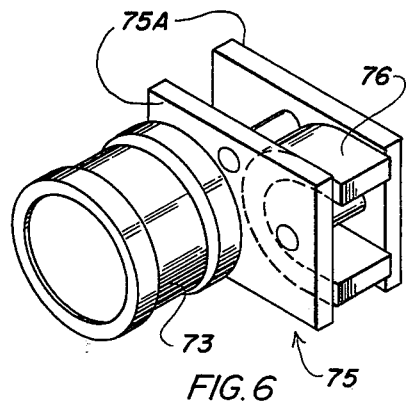
FIG. 6 is a perspective view of the retro-reflector removed from the thrust line unit and attached to a magnetic support for application to the vehicle body.

However, in certain phases of the operation of the present apparatus it is necessary to dismount the retro-reflector from the units at each rear or non-steerable wheel 17 and 18, and attached them to the adjacent surface of the body 27. The attachment means 75 is seen in FIG. 6 where the plates 75A embrace a horse shoe type or other magnetic element 76 with its pole-pieces exposed so they can engage the vehicle body metal adjacent the rear wheels. The plates 75 also embrace a socket (not shown) which is the same as the socket 74 on the plate 72 (FIG. 5) so the retro-reflector 73 can be snapped into place in the attachment means 75. In vehicles provided with non-metallic fenders, it is necessary to first apply a clip formed of magnetic material so the means 75 will be held in place. It is understood that the flat mirror 70 at each rear non-steerable wheel 17 and 18 is disposed to be in the line of the light beam projected longitudinally from the respective sensor units 19 and 22. When the plates 72 are in the down position to cover the mirrors the retro-reflective devices are located to be within the central area of the mirrors for reflecting the light beams. The positioning of the retro-reflective devices 75 on the vehicle body must be such that the projected light beam will be picked up and reflected, and when this use of the retro-reflective devices is necessary the plates 72 are in position to cover or obscure the mirrors 70.

While the preferred embodiments of apparatus are those above set forth, it is within the scope of this disclosure to use any suitable form of light energized device which performs the function of photocells 37A and 38A. Since light from the projectors 37 and 38 is a form of radiant energy in the visible spectrum, it is contemplated that the devices 37A and 38A can be selected to be compatible with the radiant energy projected by projectors 37 and 38. It is also within the scope of this disclosure to provide support means for attaching the retro 73 to the vehicle body, even though there has been disclosed a magnetic device as one means of support for the retro-reflectors 73. In attaching the retro-reflectors 73 to the vehicle body 27 care must be exercised to have these devices at substantially the same distance out from the body adjacent the rear wheels to achieve close symmetry of location to the body center line axis, just as the units 25 and 26 achieve substantially the same character of symmetry.

ELECTRONIC APPARATUS

Figure 9:
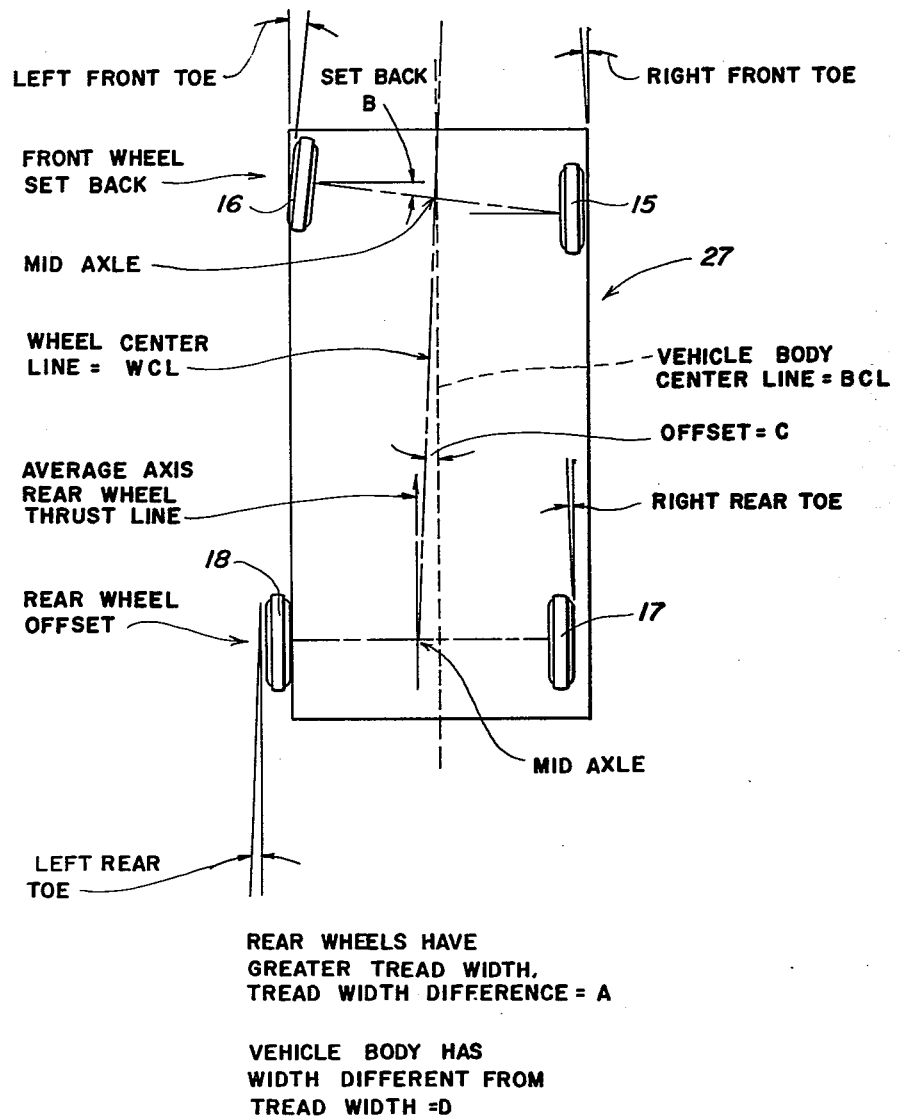
FIG. 9 is a diagrammatic plan view showing a vehicle body outline and an arrangement of wheels representative of an alignment condition which the present apparatus is capable of diagnosing.

When the outside electrical power is turned on at the console 30 current is supplied through suitable connections (not necessary to show) to the motors 40 at each sensor unit 19 and 22 so the cams 41 oscillate the projectors 37 and 38, and the light source 39 common to both projectors is energized. The transverse light beams from projectors 37 (the sensors 19 and 22 are made in right hand and left hand parts) will begin sweeping through angles which scan the positions of the light energized devices 37A and signals will be generated which are the analog of the angle of the steerable wheel planes of rotation relative to the transverse light beam relative to the axle common to these wheels. Simultaneously the projectors 38 will throw longitudinally directed beams of light toward the rear or non-steerable wheels 17 and 18 seeking the selected one of the passive reflective mirrors 70 or the passive retro-reflective devices 73. The returning light beams will strike the light energized devices 38A and produce signals which are informative of the relation of the wheels to certain characteristics of the vehicle, as follows:

When the retro-reflectors 73 are in position on the wheels to be in the longitudinally directed light beam scan the signals from devices 38A are analogs of the left and right front wheel toe with respect to the wheel center line. If the retro-reflectors 73 are positioned on the vehicle body 27 adjacent the rear wheels in the longitudinally directed light beam scan the signals from the devices 38A are analogs of the left and right front wheel toe with respect to the vehicle body center line. However, when the flat mirrors 70 are in the path of the longitudinally directed light beam scan the signals from devices 38A are analogs of the left and right front wheel toe with respect to the thrust line developed by the rear wheels. Out of these several relationships, it is a unique aspect of this invention to be able to combine sensor signals to measure and display specific alignment parameters (See FIG. 9) using a common geometric reference, such as the vehicle body center line which will be identified as BCL. In certain cases the common reference will be the wheel center line identified as WCL. Front wheel set back is the angle B formed between the perpendicular to the body center-line BCL and the average axes connecting the front wheels 15 and 16. If the body center line BCL and the wheel center line WCL do not coincide, the angular deviation is identified as C. The presence of a different tread width angle is identified as A, whereas a difference in body width to tread width angle is identified as D. Another important parameter is the angle $\theta$ (Theta) formed between either front wheel sensor mount and the path of the reflected light beam from the rear wheel (at the same side) relative to the vehicle body center line BCL.

Figure 7:
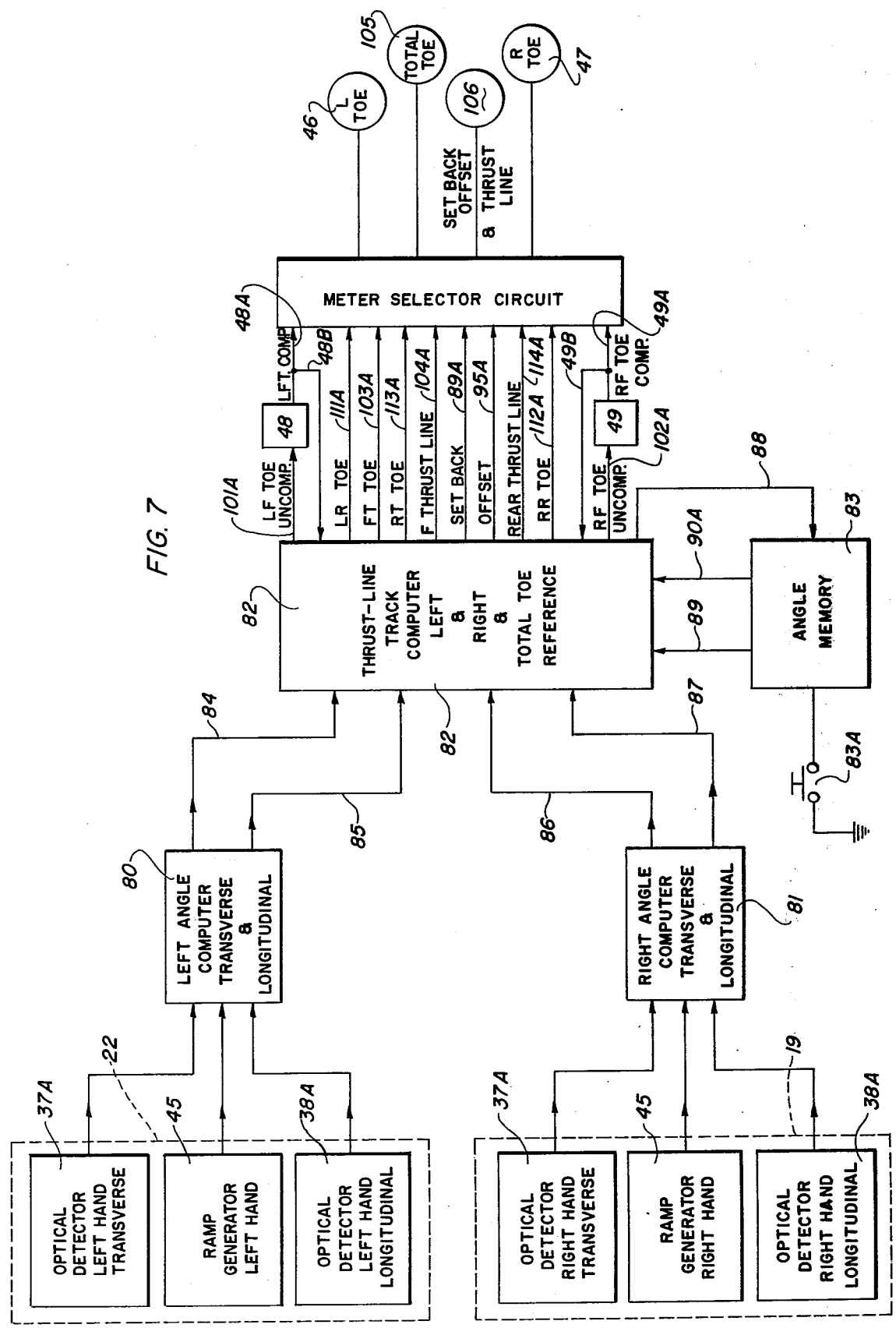
FIG. 7 is a general simplified block diagram of the circuit arrangement in the present apparatus.

From the foregoing identified parameters the following relationships will result:

Signal L=LFT (left front toe relative to BCL)+B
Signal L'=LFT+$\theta$
However, the values of L' will vary depending on the passive reflector being used, such as:
Signal L'm designates the use of the mirror 70
Signal L'r designates use of the retro 73 on the wheel
Signal L'b designates use of the retro 73 on body 27.
Also, the value of $\theta$ will vary depending on the passive reflector being used, such as:
For signal L'm $\theta$ is equal to LRT (left rear toe)
For signal L'r $\theta$ is equal to A+C
For signal L'b $\theta$ is equal to D
Thus the longitudinal sensor signals from the left front wheel sensor device 38A are voltages analogous to the geometry shown in FIG. 9, as follows:
Signal L'm=LFT−LRT (left rear toe)
Signal L'r=LFT−A+C
Signal L'b=LFT−D
Similarly, sensor signals from the right front wheel sensor device 38A are voltages analagous to the geometry shown in FIG. 9, as follows:
Signal R=RFT (right front toe)−B
Signal R'm=RFT−RRT (right rear toe)
Signal R'r=RFT−A−C
Signal R'b=RFT−D FIG. 7 illustrates the general circuit arrangement for translating the functions of the front wheel mounted sensors 19 and 22 and the rear wheel mounted thrust line units 25 and 26 into usable information about the alignment conditions of a vehicle. When armed with such information a number of corrections can be made to accommodate, reduce, or eliminate faults, such as front wheel set back or rear wheel off-set, or possibly to correct divergence of body centerline to wheel center line. In FIG. 7, a signal from the left wheel sensor 22 generated by device 37A is related to the angle of the transverse light beam to the plane of wheel rotation, and the same relationship for the opposite or right wheel sensor 19 is embodied in the signal from its device 37A. In like manner, the devices 38A in each of the front wheel sensors 19 and 22 generate signals representing the relation of the longitudinal light beams to the specific passive reflector means 70 or 73 being employed.

The respective signals from the devices 37A and 38A for the left front wheel mounted sensor 22, together with the ramp voltage generated by the potentiometer means 45 are fed into computer 80. The computer 80 develops a signal in lead 84 which represents left front wheel toe relative to body center line, plus a factor B if set-back is present, as discovered by information from the longitudinal signals. The computer 80 also develops a signal in lead 85 which represents information about the relationship of front to rear or longitudinal parameters, depending on the passive reflector being used. This signal may be dependent upon use of the mirror 70, or the retro-reflector 73 on either the rear wheel or the vehicle body.

In like manner the respective signals from the devices 37A and 38A for the right front wheel mounted sensor 19, together with the ramp voltage generated by the potentiometer means 45 are fed to computer 81. The computer 81 develops a signal in lead 86 which represents right front wheel toe relative to the body center line, minus a factor B if set-back is present, as discovered by information from the longitudinal signals. Also, the computer 81 develops another signal in lead 87 which represents longitudinal alignment information, depending upon the use of the mirror 70 or the retro-reflector 73 on the wheel or on the body.

The respective signals developed in the computers 80 and 81 are fed into a composite computer 82 and processed in predetermined ways, depending upon the information desired about the alignment. The computer 82 (FIG. 7) processes the several signals from the computers 80 and 81 in certain ways to develop alignment information. In general computer output 101A for left front toe is corrected for run-out in compensator 48 and the corrected output 48A is fed into the circuit 116 as well as being fed back to the computer 82 in lead 48B. In like manner the output 102A for right front toe is fed into run-out compensator 49, and the compensated signal is fed by line 49A into circuit 116 and by line 49B back to the computer 82. The signals stored in memory 83 are fed through computer 82 to outputs 89A and 95A to the circuit 116. As can be appreciated by comparing FIGS. 7 and 8, front total toe signal 103A, front thrust line signal 104A, left rear toe signal 111A, right rear toe signal 112A, and rear total toe signal 113A are each fed into circuit 116. Finally the rear thrust line signal 114A is fed into circuit 116 so that the desired information is made useable for display at the respective meters 46, 47, 105 and 106. When the information stored in memory 83 is to be cleared, switch 83A is actuated.

Figure 8:
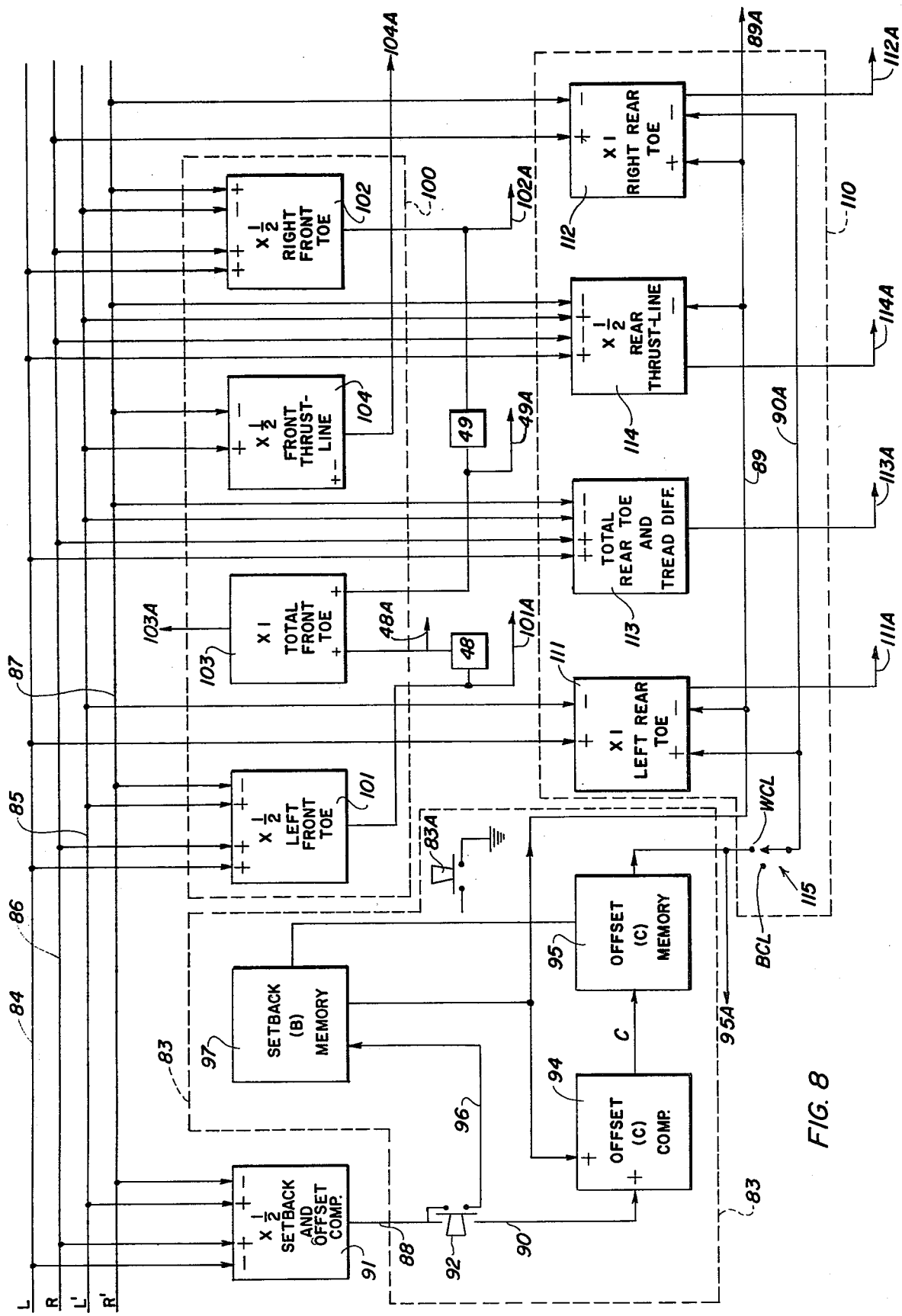
FIG. 8 is a more detailed block diagram of the circuit arrangement in the thrust line track computer and memory circuits.

The circuits present in the computer 82 are shown in the block diagram of FIG. 8. The signals fed into this computer are described in the view of FIG. 7 and comprise left front sensor signal leads 84 and 85, and right front sensor signal leads 86 and 87. It is of course understood now that the characteristics of the source of signals in leads 85 and 87 depend upon the selection and location of the passive reflector means 70 and 73. In a general way the diagram of FIG. 8 comprises a circuit 91 within the computer 82 for set-back and off-set computation in which signals from leads 84, 85, 86 and 87 are summed in relation to the positive and negative polarity indicated, and multiplied by one-half. The results of computation in circuit 91 is fed into memory 93 by lead 88. The lead 88 is connected to a two position switch 92 within the memory circuit 83 which is normally in position to make a circuit connection 90 into a sub-circuit 94 for computing the off-set information and inserting it in the memory sub-circuit 95. When switch 92 is moved to its second position a lead 96 feeds information into a set back memory sub-circuit 97. When the memory sub-circuits 95 and 97 are to be cleared normally open switch 83A is closed.

The circuits in computer 91 control the character of information to be stored in the memory circuits 83, since the utilization of memory in the case of off-set and set-back parameters is to facilitate subsequent use of such measurements to refine what would be otherwise ambiguous information. The information must be stored in the memory 83 because it is derived in one method of using units 25 and 26, but must later be algebraically mixed when the units 25 and 26 are being used in different modes. For example, the information in lead 88 is set-back when the signals in leads 85 and 87 are developed from the retro-reflectors 73 on the vehicle body 27. Switch 92 is manipulated to feed that information into the set-back memory 97. When the signals in leads 85 and 87 are derived from retro-reflectors on the wheels 17 and 18 then the information in lead 88 is off-set minus set-back. Since the input signal to the off-set computer 94 is signals C less B, the addition of the output from the set-back memory 97 causes the off-set computer to develop only off-set information for subsequent use on other computations as well as for display of the geometric conditions of the vehicle.

The circuit system of FIG. 8 includes 100 for examining front wheel toe and front thrust line or direction. Circuit 100 includes a left toe sub-circuit 101, right toe sub-circuit 102, total front toe sub-circuit 103, and front thrust line sub-circuit 104. The informative signals from leads 84, 85, 86 and 87 are connected to the sub-circuits 101, 102 and 104 in the indicated polarity and scaled with the indicated multiplier. The results are that sub-circuit 101 generates left front wheel toe and sub-circuit 102 generates right front wheel toe. The results generated in sub-circuit 101 are connected through compensation circuit 48 and displayed at the left toe meter 46. The results generated in sub-circuit 102 are connected through a compensation circuit 49 and displayed at the right toe meter 47. When these results are added in sub-circuit 103 the total front wheel toe is generated. The added signals can be displayed at meter 105. In the circuit 100 when the retro-reflectors 73 are on the wheel mounted units 25 and 26, the signals in leads 85 and 87 are related to the wheel center line WCL, but when the retro-reflectors 73 are placed on the vehicle body 27 (by the means seen in FIG. 6) the signals in leads 85 and 87 are related to the thrust line of the rear wheels. Circuit 100 also provides a sub-circuit 104 which is connected to the leads 85 and 87 to generate information about the front wheel thrust line in relation to the source of the information derived from the passive reflector means 70 and 73 and which ones are selected at which positions.

In the circuit system 82 there is included a circuit 110 for examining rear wheel toe, thrust line and tread width difference. The sub-circuit 111 develops left rear wheel toe through signals from leads 84 and 85 in the indicated polarity and scaled with the indicated multiplier. This information is modified or refined by signals from leads 89 and 90A scaled in the indicated polarity. The rear wheel toe when the retro-reflectors 73 are on the vehicle body is related to the body center line BCL, and when the retro-reflectors 73 are on the wheels 17 and 18 the wheel toe is related to the wheel center line WCL. Thus the rear wheel toe values are corrected by the off-set influences through manipulation of selector switch 115 for introducing from the memory circuit 95 the off-set refinement. The introduction of these factors is handled with the indicated polarity. In the case of the right rear wheel toe computation in sub-circuit 112, the signals from the leads 86 and 87 are introduced with the indicated polarity and the multiplier factor, subject to refinement of off-set in the indicated polarity.

Still referring to the circuit 110, the total rear wheel toe is computed in sub-circuit 113 through the complement of signals from leads 84, 85, 86 and 87 scaled by the indicated polarity and multiplied by the indicated factor. Tread width differences between the rear wheels and front wheels is also computed in this same sub-circuit 113, this factor being dependent upon the retro-reflectors being on the rear wheel units 25 and 26. In order to find the rear thrust line, the signals from leads 84, 85, 86 and 87 are fed into a sub-circuit 114 in the indicated polarity and multiplied by the indicated factor of one-half. This result is dependent upon being refined through information derived from the memory circuits 95 and 97.

While there has been shown in the drawings and described a preferred embodiment for the practice of this invention, it is to be understood that unnecessary limitations are not to be imposed on that apparatus for diagnosing vehicle wheel and body alignment relationships. In its broad aspects the invention resides in utilizing, with active sensor means mounted on a certain set of wheels, cooperative passive sensor means which have a definite relationship with the vehicle body on another set of wheels, whereby the alignment characteristics of the respective sets of wheels may be discovered and used to check the overall alignment, or used to monitor the wheel positions during alignment correction. While the foregoing description has been given with the sensors 19 and 22 located on the front or steerable wheels of the vehicle, it is to be understood that these sensors can be placed on the non-steerable wheels 17 and 18, while the passive reflector units 25 and 26 may be located on the front steerable wheels 15 and 16. It is not required that the sensors 19 and 22 and the passive means 25 and 26 need to be traded end for end of the vehicle as is required in some prior apparatus, as the alignment information using the present items of apparatus can be discovered without such interchange.

What is claimed is:

1. In vehicle wheel and wheel to body alignment diagnosing apparatus for a vehicle having an elongated body supported by first and second sets of wheels spaced longitudinally relative to the vehicle body and having alignment positions related selectively to wheel center line, body center line, and wheel thrust line references, wheel position sensing means carried by each of a first set of the vehicle wheels in position to represent the plane of wheel rotation, said sensing means having first photosensitive means positioned to face transversely between said first set of wheels, second photosensitive means positioned to face longitudinally toward said second set of wheels, and radiant energy projectors in position to direct separate radiant energy beams sweeping across paths generally perpendicular to and generally parallel with the plane of rotation of said first set of wheels such that the sweep of the perpendicular beams scan the positions of said first photosensitive means on said first wheel set, and the sweep of the beams parallel with the plane of rotation of said first set of wheels scans toward the positions of said second set of wheels; the improvement which comprises radiant energy reflective means adapted to be detachably carried by each of the second set of wheels, said detachable means including a mirror located to be substantially perpendicular to the plane of wheel rotation, means movable selectively to uncover and cover said mirror, and retro-reflector means selectively positionable on the vehicle body adjacent said second set of wheels and on said movable element, said radiant energy reflective means being scanned by the sweep of said radiant energy beams directed generally parallel with the plane of rotation of said first set of wheels; and signal generating means responsive to the scanning by said perpendicularly directed radiant energy beams of said first photosensitive means and the scanning of said radiant energy reflective means by said longitudinally directed radiant energy beams reflected back toward said second photosensitive means.

2. The improvement in the alignment diagnosing apparatus set forth in claim 1, wherein said signal generating means response to the scanning of said retroreflector means on said movable means when covering said mirrors generates signals indicative of wheel toe characteristics of said first set of wheels relative to said wheel center line reference.

3. The improvement in the alignment diagnosing apparatus set forth in claim 1, wherein said signal generating means response to the scanning of said retroreflector means on said vehicle body and with said movable means covering said mirror generates signals indicative of wheel toe characteristics of said first set of wheels relative to said body center line reference.

4. The improvement in the alignment diagnosing apparatus set forth in claim 1, wherein said signal generating means response to the scanning of said mirrors uncovered by said movable means generates signals indicative of wheel toe characteristics of said first set of wheels relative to the thrust line of said second set of wheels.

5. The improvement in the alignment diagnosing apparatus set forth in claim 1, wherein said signal generating means response to the scanning of said first photosensitive means on said first set of wheels generates signals indicative of wheel toe characteristics of said first set of wheels relative to a common line joining said first set of wheels.

6. Vehicle wheel alignment diagnosing apparatus for a vehicle having an elongated body and first and second sets of wheels longitudinally spaced apart along the body, with the wheels of each set laterally spaced relative to the longitudinal axis of said body; said apparatus comprising: radiant energy projector means supported on each wheel of a first set of said sets of wheels in position to direct radiant energy beams transversely and longitudinally of said body; and a wheel alignment diagnosing device for each wheel of a second set of wheels, each of said devices including adapter means fitted on the wheels of said another set, a frame carried by said adapter means, a first reflector carried by said frame in position to redirect the radiant energy beam projected in that direction, a second reflector for returning the radiant energy beam, and means supporting said second reflector from said frame for movement between an operative position in front of and obscuring said first reflector and an inoperative position removed from obscuring said first reflector.

7. The alignment diagnosing apparatus set forth in claim 6, wherein means is carried by said adapter in position to adjust said frame for locating said first reflector in a desired position relative to the plane of rotation of the wheel to which it is fitted, whereby said means compensates the position of said frame for wheel runout.

8. The alignment diagnosing apparatus set forth in claim 6, wherein said first reflector is a mirror, and said frame is adapted to hold the plane of said mirror substantially parallel with the axis of rotation of the wheel to which said adapter means is fitted.

9. The alignment diagnosing apparatus set forth in claim 6, wherein said second reflector is a retro-reflector, and said means supporting said second reflector from said frame is a plate.

10. The alignment diagnosing apparatus set forth in claim 6, wherein said second reflector is removably connected to said means supporting it from said frame, and other means is adapted to support said second reflector from the vehicle body when said supporting means obscures said first reflector.

11. A thrust line and radiant energy beam redirecting unit for vehicle wheel alignment diagnosing apparatus, said unit comprising: a frame structure; radiant energy beam reflecting means carried by said frame structure for exposure to the radiant energy beam, said reflecting means consisting of a flat mirror fixed in said frame structure, cover means movably mounted on said frame structure for selectively covering and uncovering said flat mirror, and a retro-reflector carried by said frame cover means for movement therewith, said retro-reflector replacing said flat mirror upon movement of said cover means to cover said flat mirror; adapter means engaging a vehicle wheel; and means interconnecting said frame structure and said adapter means, said interconnecting means being operable to orient said reflecting means into a predetermined position representing the plane of rotation of the wheel engaged by said adapter means for compensating said reflecting means for wheel runout.

* * * * *